Nov. 13, 1962 W. H. BERTRAM 3,063,061
PORTABLE TOILET
Filed Dec. 19, 1960
2 Sheets-Sheet 1

INVENTOR.
WALLACE H. BERTRAM
BY Jack M. Miller
AGENT

Nov. 13, 1962 W. H. BERTRAM 3,063,061
PORTABLE TOILET
Filed Dec. 19, 1960 2 Sheets-Sheet 2

INVENTOR.
WALLACE H. BERTRAM
BY
*Jack M. Miller*
AGENT

United States Patent Office 3,063,061
Patented Nov. 13, 1962

3,063,061
PORTABLE TOILET
Wallace H. Bertram, South End New York Ave.,
La Crescenta, Calif.
Filed Dec. 19, 1960, Ser. No. 76,749
7 Claims. (Cl. 4—134)

This invention relates generally to waste and refuse receptacles, and in particular to a lightweight folding toilet using a disposable excretion collection bag supported beneath a conventionally shaped toilet seat.

The collection and disposal of human excretion is conventionally handled by sewers in conjunction with a readily available water supply. When sewer facilities are not available, as in trains, airplanes, buses, and the like, it is customary to employ chemical toilets which collect human waste in an open-topped receptacle containing deodorizing and disinfecting solutions. However, such chemical toilets are usually distasteful to use, inconvenient to service, and generally lack portability.

Since existing portable dry toilets are also cumbersome and inconvenient to use, there is particularly a great need for a simple, lightweight, and effective excretion collecting and disposal apparatus for use with such diversified activities as hunting, camping, mountain climbing, fishing, boating, flying and trailering. Usually, these activities are conducted in areas where sanitary toilet facilities are not available. Furthermore, a portable sanitary toilet is much needed for sick room use, in barns, mountain cabins, on picnics, on construction sites, and the like. Prior art devices have a variety of defects including inconvenient refuse disposal, lack of compactness, not collapsible without dismantling, not of standard toilet height, poor odor retention, heavy, and complicated to operate.

It is accordingly an object of this invention to provide an improved waste and refuse receptacle.

Another object of this invention is to provide an improved portable toilet which has the comfort and convenience of the home while incorporating ease and simplicity of excretion collection and disposal without plumbing.

A further object of this invention is to provide a portable toilet which is simple, lightweight, compact, sturdy, durable, foldable, inexpensive to construct, and which employs a readily detachable disposable waste collection bag.

Another object of this invention is to provide a portable toilet having a disposable excretion collection bag removably held open beneath the toilet seat opening and having an excretion collection bag ejector for releasing the bag which minimizes the possibility of contact with the bag contents while removing soiled bags.

A still further object of this invention is to provide an improved quick-release bagging apparatus.

Other and related objects will be apparent from the detailed description of the invention and various advantages not specifically referred to herein will be apparent to those skilled in the art on employment of the invention in practice.

I have now found that the foregoing objects and their attendant advantages can be particularly realized in a portable toilet incorporating a toilet seat with a central opening, the seat being supported by a suitable stool. The top of a waste collection bag is held open beneath the seat central opening and against the seat bottom by a retaining ring which can be readily released from the seat by means of a bag ejector which is also attached to the seat bottom. Usually, the total weight of such a portable toilet is less than four pounds.

The invention will be more readily understood by reference to the accompanying drawings which form a part of this application.

Figure 1:
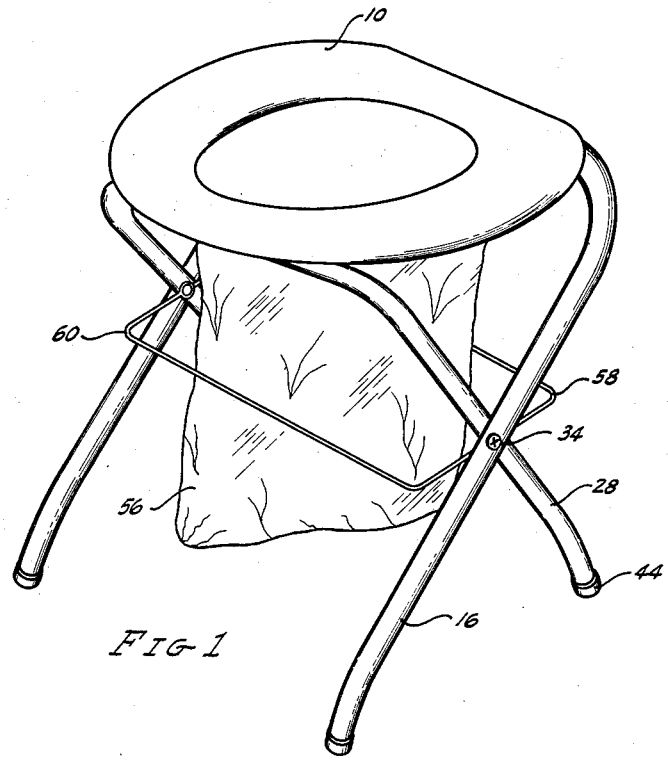
FIGURE 1 is an illustration in perspective of the portable toilet of this invention with an excretion collection bag in place and with the wire odor retention clasps in the open position.

Referring now more particularly to FIGURES 1, 3, 4, 5, 6 and 7 the portable toilet there shown comprises a conventional oval toilet seat 10 having a centrally disposed opening 12, the seat being supported on a cross-legged stool comprising two U-shaped tubing members, the bights of which are attached to the seat and whose legs are crossed and pivotally connected intermediate their length. A convenient overall height of the portable toilet of this invention has been found to be about 16 inches. Toilet seat 10 can take any convenient form in this invention, but usually has the same shape as conventional commercially available contoured full size toilet seats. Since the portable toilet is designed for usage where protection from the elements is frequently not available, it is desirable, and a necessity in very cold climates, that the seat be constructed of a material having a relatively low thermal conductivity. Materials such as cork, pressed wood, laminated wood, and the like have been found satisfactory, and provide the user with a comfortable, quickly warmed seat.

The aforementioned cross-legged stool comprises an outer U-shaped stool member having a seat engaging bar 14 and two substantially equal length parallel legs 16. Seat engaging bar (bight) 14 is attached to the bottom of seat 10 at one end of the oval by means of brackets 18. Brackets 18 comprise a straight portion secured by screws 22 to seat 10 and an integral curved portion shaped so as to rotatably hold seat engaging bar 14. Brackets 18 are preferably formed as illustrated with an open curved section only partially circumscribing seat engaging bar 14, and not as a closed loop surrounding seat engaging bar 14. Thus, when the portable toilet is subjected to field conditions, seat engaging bar 14, rotatably held in bracket 18, readily clears the surfaces between itself and brackets 18 of debris when moved.

Figure 4:
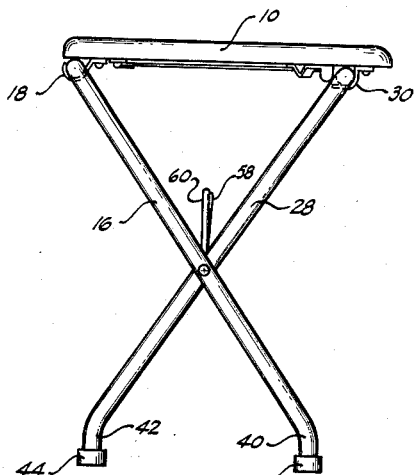
FIGURE 4 is a side view of the same portable toilet.

The inner U-shaped stool member comprises seat engaging bar (bight) 26 and two substantially equal length parallel legs 28. Bar 26 is sufficiently short than seat engaging bar 14 so that legs 28 fit within legs 16 when the portable toilet is folded as in FIGURE 2. Seat engaging bar 26 is held against seat 10 by open angle bracket 30. Bracket 30, secured by screw 32 to the bottom of seat 10 at the end of the oval seat opposite brackets 18, is adapted to snugly hold seat engaging bar 26. As shown in FIGURE 4, seat engaging bar 26 can be disengaged from bracket 30 by moving bar 26 toward the center of seat 10, thus permitting folding of the portable toilet.

The above-described inner and outer U-shaped stool members can be made by any suitable material which has the necessary strength, but, preferably, the construction material is a lightweight metal tubing such as one of the high strength aluminum alloys used in aircraft manufacture.

Figure 3:
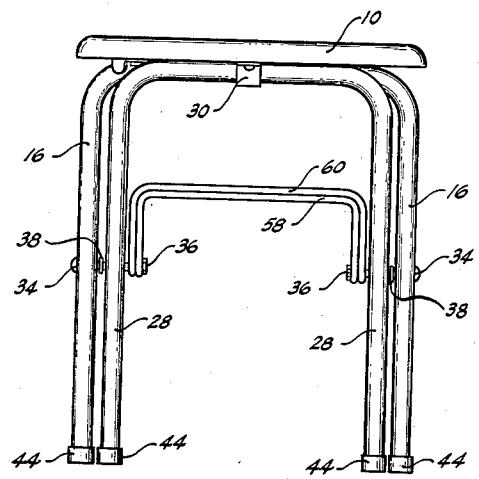
FIGURE 3 is a front view of a portable toilet according to the invention.

Each adjacent pair of legs 16 and 28, pivotally connected by means of pivot bolts 34, are held in snug movable relationship by adjustment of lock nuts 36. Washers 38 are positioned on pivot bolts 34 between legs 16 and 28 to facilitate leg movement when collapsing the portable toilet of this invention. Pivot bolts 34 are positioned intermediate of legs 16 and 28 so that seat 10 is held substantially horizontal when the assembled toilet is supported by a horizontal surface as illustrated in FIGURES 1, 3, and 4. The extremities of legs 16 and 28 are curved so that the end portions 40 and 42, respectively, of these legs are substantially vertical when the toilet is assembled on a horizontal surface. The tips of end portions 40 and 42 are covered by leg glides 44. Leg glides 44, usually made of rubber, plastic, or the like, will not mar surfaces used to support the portable toilet of this invention while providing a non-slip grip for legs 16 and 28, and they further prevent dirt from entering the open tube ends of legs 16 and 28.

Attached to the bottom of seat 10 is bag retaining ring 46 which is held in position by ring retaining lug 50 and open angle ring clips 48 which are attached to the bottom of seat 10 by means of screws 52. Bag retaining ring 46 is a substantially rigid metal ring, usually made of about ⅛ to ¼-inch diameter metal rod, formed so as to have a ring diameter slightly greater than the diameter of central opening 12. Ring 46 is held in place against the bottom of seat 10 by means of the compressive force exerted in slightly deforming ring 46 when slipping it into place between spaced apart ring clips 48 and ring retaining lug 50. Ring retaining lug 50 comprises a central metal screw portion and a flexible resilient ball surrounding the top of the metal screw portion so as to provide a protruding resilient surface on ring retaining lug 50. Ring clips 48 are spaced from lug 50 in such a manner that when ring 46 is placed within ring clips 48, a slight compression or biasing of ring 46 allows ring 46 to slide past the protruding resilient ball surface. Thus, ring 46 snaps securely into place against the bottom of seat 10.

Figure 7:
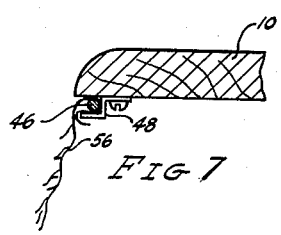
FIGURE 7 is a fragmentary cross-section view of the toilet seat taken on the line 7—7 showing a ring clip holding the bag retaining ring with a collection bag in place.
Figure 5:
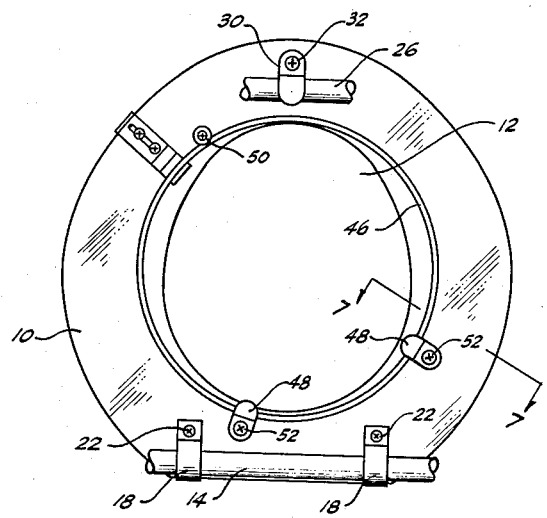
FIGURE 5 is an inverted plan view of the portable toilet with the legs omitted.

An impervious bag 56, as shown in FIGURE 1, is positioned immediately below central opening 12 of seat 10. The open end of bag 56, having an opening larger than ring 46, is folded outward from the inside of ring 46 so that the top edge of bag 56 folds over ring 46, usually with an overlap of about 1 inch. Thus, when ring 46 is snapped into place beneath seat 10, bag 56 is securely held between ring 46 and seat 10 as shown in FIGURE 7. Bag 56 can be made of any substantially impervious material such as treated paper, rubber, plastic film or the like. However, the preferred material of construction for bag 56 is an opaque plastic sheet, shaped either as a tube closed at one end or as a rectangular envelope sealed on the two long edges and on one short edge. A white opaque polyethylene rectangular bag measuring about 15 inches long and about 14 inches wide with a wall thickness of about 1½ mils has been found particularly satisfactory.

Figure 6:
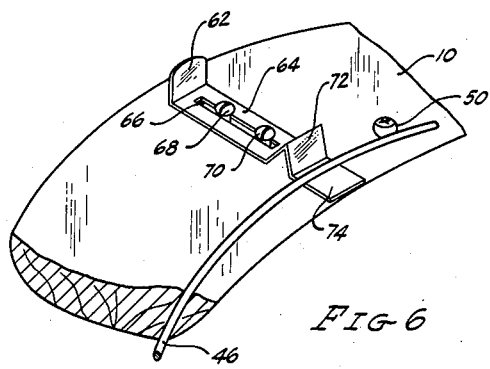
FIGURE 6 is a frgamentary isometric view of the inverted portable toilet seat bottom showing the means for releasing a soiled collection bag.

The bag ejector of this embodiment of the invention is a generally L-shaped clip formed from a strip of metal bent as shown in FIGURE 6 to include a flat base member 64, an upright arm 62 integrally attached to one end of flat base member 64, a V-shaped member 72 having one extremity of the V integrally attached to base member 64 and the other extremity of the V integrally attached to projecting member 74 which lies in the same plane as base member 64. Any arcuate shape can be satisfactorily used for member 72. Base member 64 has an elongated slotted opening 66 which is adapted to receive the shanks of screws 68 and 70 which hold base member 64 in a radially slidable relationship with the bottom of seat 10. Screw 70 is located so as to allow projecting member 74 to be positioned under ring 46 when the end of slot 66 nearest ring 46 is abutting against the shank of screw 70. Screw 68 is located so as to allow sufficient movement of the bag ejector towards ring 46 when pressure is applied to upright arm 62 to engage the surface of V-shaped member 72 closest to ring 46 with ring 46, and to further allow this cam surface of V-shaped member 72 to force ring 46 from the seat bottom until ring 46 is moved away from and over retaining lug 50. Ring 46 is then free to fall from ring clips 42 and thus detach bag 56 from the bottom of seat 10.

Bag 56 can be temporarily sealed after a single use by means of odor retention clasps 58 and 60. Clasps 58 and 60 are U-shaped wire members which are adapted to fit between legs 28 as shown in FIGURE 3. The legs of U-shaped clasps 58 and 60 are formed into loops which circumscribe pivot bolts 34 between legs 28 and lock nut 36. Clasp 58, slightly smaller than clasp 60, fits within clasp 60 when folded. The bights of clasps 58 and 60, when closed in the upright position as shown in FIGURES 3 and 4, seal bag 56 similarly to the closing of a purse. During use of the portable toilet, clasps 58 and 60 are in their horizontal open position as shown in FIGURE 1.

It can be seen that the portable toilet of this invention can readily be kept in a sanitary condition and will not need cleaning after only one use. Thus, a great convenience is provided for groups engaged in activities such as camping which require multiple use facilities. The invention has further application as a refuse or waste receptable for food scraps, empty cans, and the like. A used bag 56 containing refuse, waste, and the like can be easily disposed of by burying, incinerating, or by depositing in public waste collectors and the like. When a soiled bag 56 is removed from ring 46, it preferably is sealed by securing the bag top with a string, wire tie, or by tying a knot in the top portion of the bag.

Figure 2:
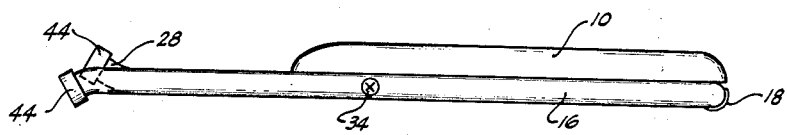
FIGURE 2 is a side view of the portable toilet of this invention when folded.

The portable toilet of this invention is readily collapsed as shown in FIGURE 2, usually to a thickness of about 2 inches, but need not be dismantled, for storage and transportation. When transporting the portable toilet of this invention, a rectangular cardboard container is preferably used. Such a box containing the portable toilet in the collapsed condition facilitates packing and transporting in automobiles, airplanes, boats and the like.

The apparatus of this invention as illustrated can generally be adapted, particularly with the legs removed, as a quick-release bagging apparatus in which the bag can be releasably attached to any support member having an opening. Thus, when a bag is filled, it can be quickly released from the support member by the aforementioned bag ejection or releasing means.

Various other changes and modifications are apparent from the description of this invention and further modifications will be obvious to those skilled in the art. Such modifications and changes are intended to be included within the scope of this invention as defined by the following claims.

I claim:

1. A toilet comprising: a seat having an opening; legs supporting said seat; a ring releasably attached to the bottom of said seat, said ring being greater in diameter than said opening; a bag having a normally open top located beneath said opening, said top being clamped between said ring and the bottom of said seat; and bag ejection means for dropping said bag and said ring from said seat, said bag ejection means being movably attached to the bottom of said seat.

2. A toilet as defined in claim 1 wherein said bag ejection means comprises a generally L-shaped clip having an elongated slot located therein.

3. A portable toilet comprising: a toilet seat having a central opening; a cross-legged stool supporting said seat; at least two spaced apart brackets attached to the bottom of said seat on one side of said central opening; a ring retaining lug attached to the bottom of said seat on the side of said central opening opposite said brackets; a bag retaining ring biased between said brackets and said ring retaining lug; a bag located beneath said central opening, said bag having a normally open top and said top being held securely between said biased ring and the bottom of said seat; and a bag ejection member radially slidably attached to the bottom of said seat adjacent to said ring retaining lug and projecting between said ring and said seat, said bag ejection member having a sloped cam surface located intermediate its length so as to engage said ring when said bag ejection member is moved toward said ring wherein said ring is raised away from and over said ring retaining lug thereby releasing said ring from the bottom of said seat.

4. A portable disposable bag toilet comprising: a contoured oval toilet seat having a top and a bottom and having a centrally disposed oval opening; a cross-legged stool supporting and attached to the bottom of said seat; two spaced apart brackets attached to said bottom of said seat, said brackets being located on one side of said oval; a ring retaining lug attached to said bottom of said seat, said lug being located on the side of said oval opposite said brackets; a bag retaining ring biased between said brackets and said lug, said ring being held firmly against said bottom of said seat by said brackets and said lug; an impervious bag having a normally open top located beneath said centrally disposed oval opening, said top of said bag overlapping said ring so as to be held securely clamped between said biased ring and said bottom of said seat; and a bag releasing member slidably attached to said bottom of said seat adjacent to said ring retaining lug to move radially thereto, said member having one extremity projecting between said ring and said seat and the other extremity comprising a downwardly extending handle, a sloped cam surface being located on said member intermediate its length to engage said ring when said handle is pushed toward said ring causing said member to move inward wherein said ring is forced away from and over said ring retaining lug which releases said ring and said bag from said bottom of said seat.

5. A portable toilet as defined in claim 3 including bag sealing means attached to said cross-legged stool for temporarily closing said bag from the atmosphere after use.

6. A portable toilet as defined in claim 3 wherein said bag ejection member comprises: an L-shaped body having a short leg and a long leg; said long leg having an arcuate portion intermediate the ends thereof; said uppermost apex of said arcuate portion being in substantially the same plane as the extreme free end of said short leg.

7. A portable toilet as defined in claim 6 wherein said long leg of said bag ejection member has an elongated slot therein between said arcuate portion and said short leg.

References Cited in the file of this patent

UNITED STATES PATENTS

| 1,416,177 | Dick | May 16, 1922 |
| 2,801,426 | La Gorce et al. | Aug. 6, 1957 |
| 2,804,121 | Singleton | Aug. 27, 1957 |

FOREIGN PATENTS

| 875,087 | Germany | Apr. 30, 1953 |
| 1,246,396 | France | Oct. 10, 1960 |